United States Patent
Wang

(10) Patent No.: US 12,198,175 B2
(45) Date of Patent: Jan. 14, 2025

(54) OBJECT COMPARISON METHOD, AND DEVICE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Qiang Wang, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 340 days.

(21) Appl. No.: 17/777,414

(22) PCT Filed: Aug. 19, 2020

(86) PCT No.: PCT/CN2020/110000
§ 371 (c)(1),
(2) Date: May 17, 2022

(87) PCT Pub. No.: WO2021/098306
PCT Pub. Date: May 27, 2021

(65) Prior Publication Data
US 2022/0405823 A1    Dec. 22, 2022

(30) Foreign Application Priority Data
Nov. 18, 2019 (CN) .......................... 201911130833.9

(51) Int. Cl.
*G06Q 30/00*    (2023.01)
*G06Q 30/0601*  (2023.01)
*G06T 19/00*    (2011.01)

(52) U.S. Cl.
CPC ..... *G06Q 30/0629* (2013.01); *G06Q 30/0643* (2013.01); *G06T 19/006* (2013.01); *G06T 2200/24* (2013.01)

(58) Field of Classification Search
None
See application file for complete search history.

(56) References Cited

U.S. PATENT DOCUMENTS

| 2014/0063061 | A1* | 3/2014 | Reitan ....... | G09G 5/14 345/633 |
| 2014/0178029 | A1* | 6/2014 | Raheman ..... | H04N 5/91 386/224 |
| 2020/0204649 | A1* | 6/2020 | Fowe ........ | H04L 67/131 |

FOREIGN PATENT DOCUMENTS

| CN | 105183154 A | 12/2015 |
| CN | 107622524 A | 1/2018 |

(Continued)

OTHER PUBLICATIONS

Chinese Patent Office Notice of First Examination Opinion for Application No. 201911130833.9, dated Oct. 27, 2023 (8 pages including Statement of Relevance).

(Continued)

*Primary Examiner* — Martin Mushambo
(74) *Attorney, Agent, or Firm* — Michael Best & Friedrich LLP

(57) ABSTRACT

The disclosure discloses an object comparison method and apparatus, relating to the technical field of computers. One specific implementation mode of the method comprises: acquiring, in response to a selection operation of at least two objects in an object list, corresponding object information according to identifiers of the at least two objects; performing, on the basis of each object information, three-dimensional model information rendering to obtain three-dimensional model information of each of the objects; and (Continued)

receiving image information of a real scenario to construct three-dimensional reconstruction information of the real scenario, and superimposing the three-dimensional model information of each of the objects onto the three-dimensional reconstruction information for display and comparison. The implementation mode enables a user, when selecting objects, to perform an intuitive comparison on the basis of the three-dimensional model information of the objects in addition to knowing the objects on the basis of the basic information thereof, so as to give the user an intuitive feeling and improve the efficiency of object recommendation.

9 Claims, 6 Drawing Sheets

(56) References Cited

FOREIGN PATENT DOCUMENTS

| | | |
|---|---|---|
| CN | 107767211 A | 3/2018 |
| CN | 108492356 A | 9/2018 |
| CN | 108510368 A | 9/2018 |
| CN | 109410314 A | 3/2019 |
| CN | 109634925 A | 4/2019 |
| CN | 110232743 A | 9/2019 |
| CN | 110458648 A | 11/2019 |
| KR | 20080041079 A | 5/2008 |

OTHER PUBLICATIONS

International Search Report and Written Opinion for Application No. PCT/CN2020/110000 dated May 27, 2021 (11 pages including English translation of the written opinion).

Extended European Search Report for Application No. 20889388.3 dated Aug. 11, 2023 (9 pages).

Tang et al., "AR Interior Designer: Automatic Furniture Arrangement using Spatial and Functional Relationships," International Conference on Virtual Systems & Multimedia (VSMM), 2014, pp. 345-352.

Chinese Patent Office Action for Application No. 201911130833.9 dated Apr. 12, 2024 (29 pages including English machine translation).

* cited by examiner

OBJECT COMPARISON METHOD, AND DEVICE

CROSS-REFERENCE TO RELATED APPLICATION(S)

This is a U.S. national stage entry of International Patent Application No. PCT/CN2020/110000, filed on Aug. 19, 2020, which claims priority to Chinese Patent Application No. 201911130833.9, filed on Nov. 18, 2019, the entire contents of each of which are fully incorporated herein by reference.

TECHNICAL FIELD

The disclosure relates to the technical field of computers, and in particular relates to an object comparison method and apparatus.

BACKGROUND

At present, comparisons of objects, especially 3C products, furniture, automobiles, and the like, on e-commerce websites or in APP shopping, are mainly simple comparisons of pictures and basic parameter information, and the three-dimensional shapes of the objects are usually imagined by users, lacking intuitive comparisons of real objects.

SUMMARY

In view of this, an embodiment of the disclosure provides an object comparison method and apparatus, which can at least solve the problem that there is a lack of an intuitive, multi-angle and multi-environment comparison of objects of the same type in the prior art.

In order to achieve the aforesaid object, according to one aspect of the embodiment of the disclosure, an object comparison method is provided, the method comprising: acquiring, in response to a selection operation of at least two objects in an object list, corresponding object information according to identifiers of the at least two objects; performing, on the basis of each object information, three-dimensional model information rendering to obtain three-dimensional model information of each of the objects; and receiving image information of a real scenario to construct three-dimensional reconstruction information of the real scenario, and superimposing the three-dimensional model information of each of the objects onto the three-dimensional reconstruction information for display and comparison.

Optionally, the object information includes a three-dimensional resource and an information digest value;
the step of performing, on the basis of the each object information, three-dimensional model information rendering further comprises: processing, using an information digest algorithm, the three-dimensional resource of each of the objects to obtain a first information digest value; and performing, on the basis of each of the three-dimensional resources, three-dimensional model information rendering if the information digest value is the same as the corresponding first information digest value.

Optionally, the object information further includes a three-dimensional resource download address;
after the obtainment of the first information digest value, the step further comprises: performing, on the basis of the three-dimensional resource download address in the object information, a three-dimensional resource download if the information digest value is different from the corresponding first information digest value; processing, using the information digest algorithm, the downloaded three-dimensional resources to obtain a second information digest value; and performing, using the downloaded three-dimensional resources, three-dimensional model information rendering if the information digest value is the same as the corresponding second information digest value.

Optionally, the construction of three-dimensional reconstruction information of the real scenario comprises: determining, in a manner of a three-dimensional vision coordinate system, three-dimensional coordinate values of respective pixels in the image information to construct the three-dimensional reconstruction information on the basis of the three-dimensional coordinate values.

Optionally, the step of superimposing the three-dimensional model information of each of the objects onto the three-dimensional reconstruction information for display and comparison comprises: determining, in accordance with a predetermined relative spatial position relationship in the three-dimensional reconstruction information, a storage position of each three-dimensional model information to superimpose each three-dimensional model information onto the three-dimensional reconstruction information at the corresponding storage position for display.

In order to achieve the aforesaid object, according to another aspect of the embodiment of the disclosure, an object comparison apparatus is provided, the apparatus comprising: an information acquiring module for acquiring, in response to a selection operation of at least two objects in an object list, corresponding object information according to identifiers of the at least two objects; a model establishing module for performing, on the basis of each object information, three-dimensional model information rendering to obtain three-dimensional model information of each of the objects; and a three-dimensional superimposing module for receiving image information of a real scenario to construct three-dimensional reconstruction information of the real scenario, and superimposing the three-dimensional model information of each of the objects onto the three-dimensional reconstruction information for display and comparison.

In order to achieve the aforesaid object, according to a further aspect of the embodiment of the disclosure, an object comparison electronic device is provided.

The electronic device according to the embodiment of the disclosure comprises: one or more processors; and a storage means for storing one or more programs, the one or more programs, when executed by the one or more processors, causing the one or more processors to implement any of the aforesaid object comparison methods.

In order to achieve the aforesaid object, according to a further aspect of the embodiment of the disclosure, a computer-readable medium, on which a computer program is stored, is provided, wherein the program, when executed by a processor, implements any of the aforesaid object comparison methods.

According to the solution provided by the disclosure, the aforesaid one embodiment in the disclosure has the following advantages or beneficial effects: when viewing an object list or object details, a user adds relevant products to a comparison queue by clicking "Added to AR comparison", and then starts an AR display for comparison by clicking "Starting AR comparison" in the comparison queue, thereby achieving an intuitive, multi-angle, multi-environment and real-time comparison of two or more objects.

Further effects of the aforesaid non-conventional optional manners will be described below in combination with specific implementation modes.

BRIEF DESCRIPTION OF THE DRAWINGS

Figures are used to better understand the disclosure, and do not form improper limitations of the disclosure. Where.

DETAILED DESCRIPTION

The exemplary embodiments of the disclosure, including various details of the embodiments of the disclosure, are described below in combination with the figures to facilitate understanding, and shall be considered to be exemplary ones only. Thus, those skilled in the art should recognize that various changes and modifications may be made to the embodiments described herein without departing from the scope and spirit of the disclosure. Similarly, for clarity and conciseness, descriptions of well-known functions and structures are omitted in the descriptions below.

Figure 1:
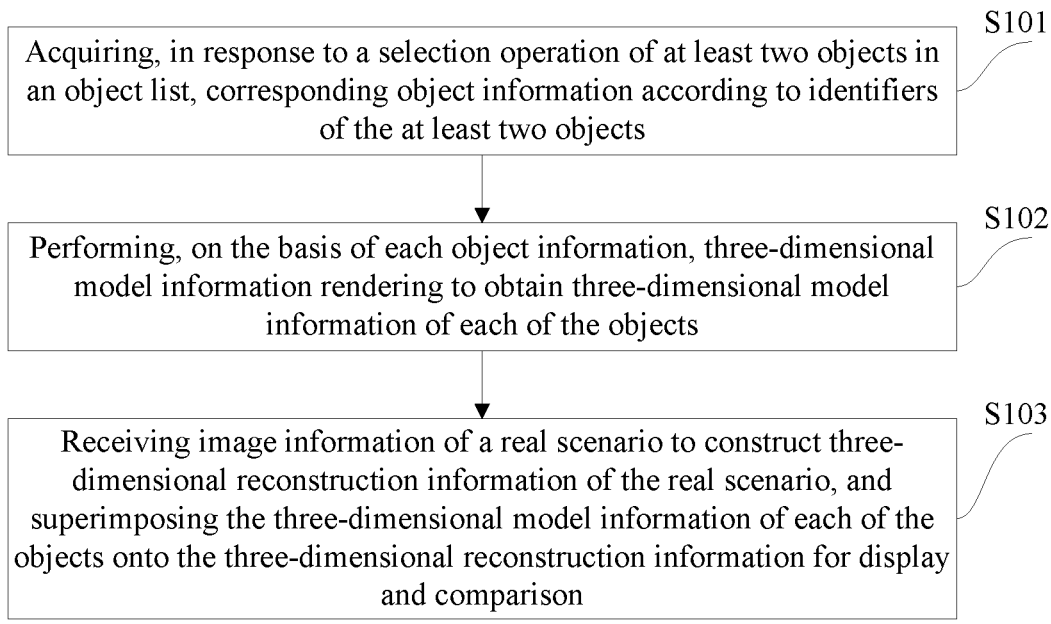
FIG. 1 is a schematic diagram of a main flow of an object comparison method according to an embodiment of the disclosure.

FIG. 1 shows a main flowchart of an object comparison method provided by an embodiment of the disclosure, comprising the following steps:

S101: acquiring, in response to a selection operation of at least two objects in an object list, corresponding object information according to identifiers of the at least two objects;

S102: performing, on the basis of each object information, three-dimensional model information rendering to obtain three-dimensional model information of each of the objects; and S103: receiving image information of a real scenario to construct three-dimensional reconstruction information of the real scenario, and superimposing the three-dimensional model information of each of the objects onto the three-dimensional reconstruction information for display and comparison.

In the aforesaid implementation mode, as for the step S101, an AR comparison can solve a comparison problem that cannot be solved by language characters and images.

An object list may be a list formed by combining objects meeting a search request obtained by entering keywords such as characters, pictures, etc. in a search bar by a user; or a list composed of objects recommended by default when a user opens a home page of an APP or a website.

Figure 2:
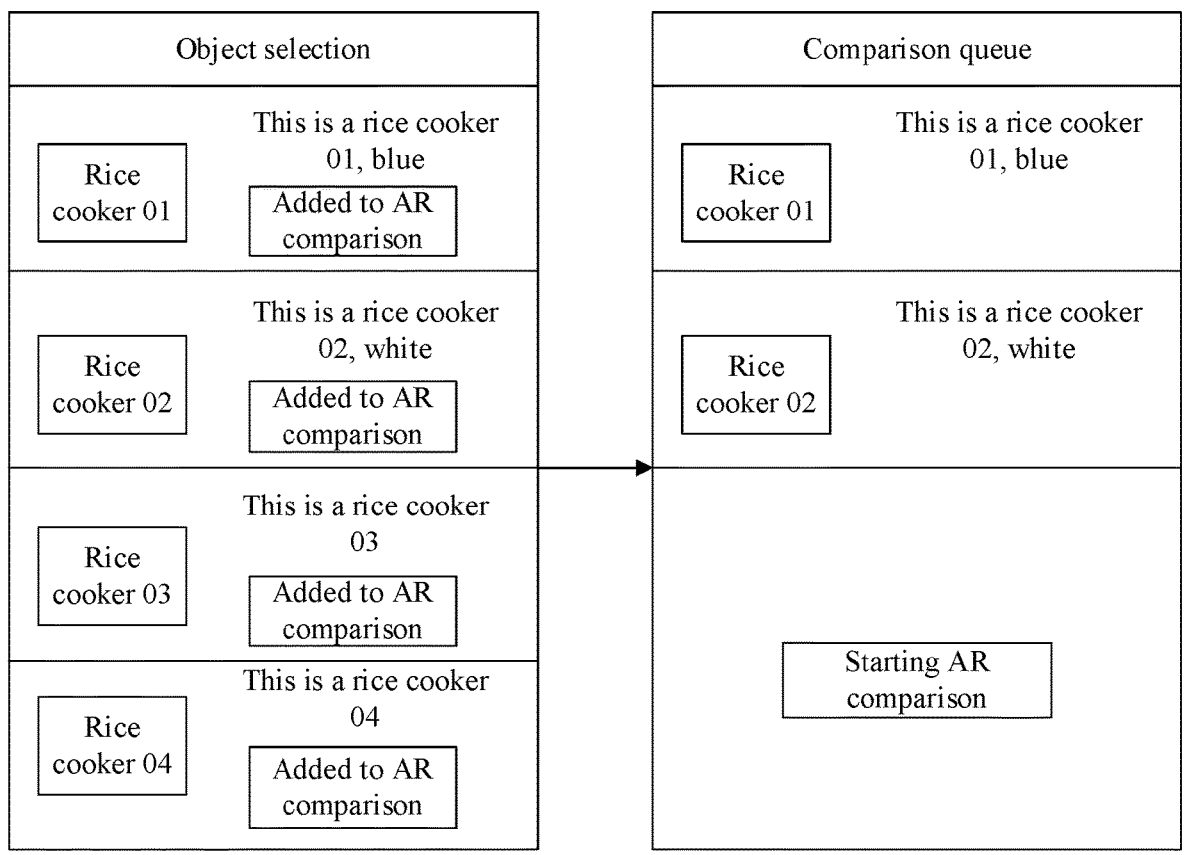
FIG. 2 is a schematic diagram of a flow of selecting objects according to an embodiment of the disclosure.

As shown in FIG. 2, an option "Added to AR (Augmented Reality) comparison" is provided after each object in the object list, and the user clicking the option just means the selection. Since the disclosure mainly compares different objects, the user is required to click the option "Added to AR (Augmented Reality) comparison" of at least two objects. Upon each click of the user, the selected object will be automatically added to an "AR comparison queue".

Figure 3:
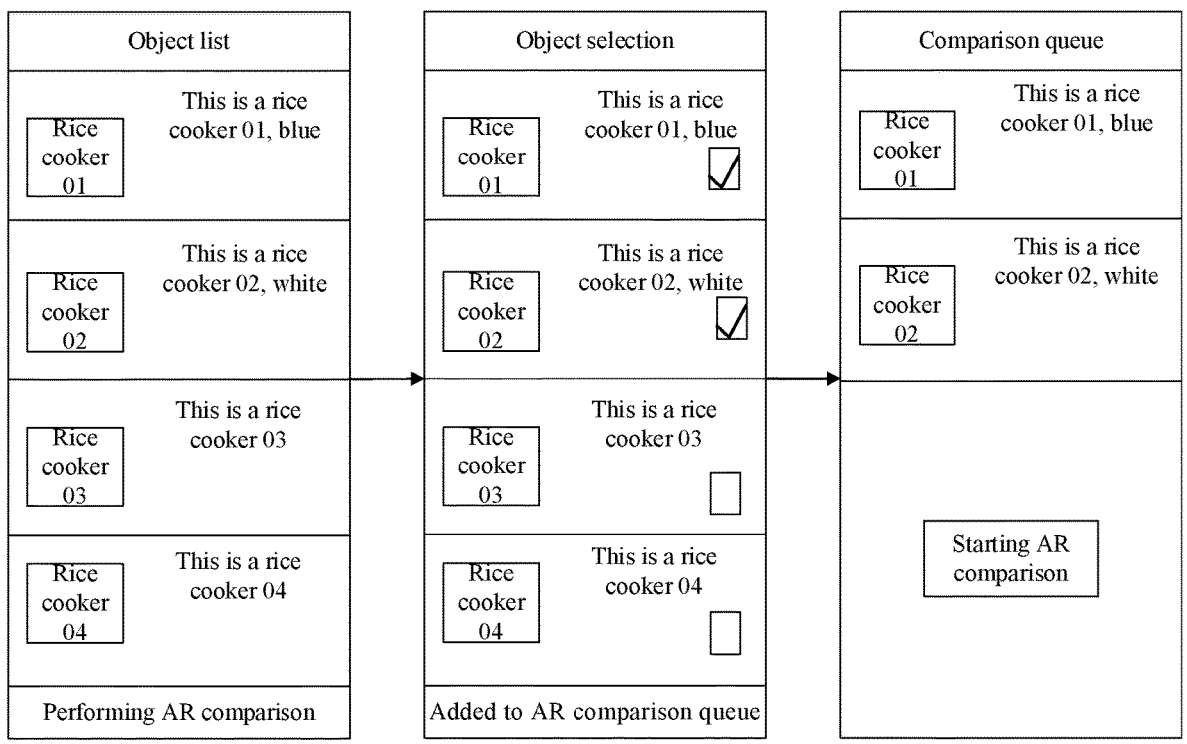
FIG. 3 is a schematic diagram of another flow of selecting objects according to an embodiment of the disclosure.

As shown in FIG. 3, after the display of the object list, the user clicks a button "Performing AR comparison" to enter an AR comparison operation interface. The difference from that shown in FIG. 2 is that at this time, only one selection box is displayed after each object, and the user checking the box just means the selection. After the completion of the selection, clicking an option "Added to AR comparison queue" at the bottom (which can be actually other positions) of the interface just adds all of the selected objects to the AR comparison queue.

By setting a character or UI (User Interface), or a click event semantically associated with "Added to AR comparison" in the object list or object details, the user adds, by clicking at least two objects, the objects selected by clicking to the AR comparison queue.

It shall be noted that a platform is generally managed on the basis of IDs of objects, so the ID information of the objects is displayed in the object list and the AR comparison queue.

In the AR comparison queue, the basic information of each of the objects is obtained according to the ID of the object; wherein the basic information includes, but is not limited to, shape feature information, such as volume, color, appearance, etc., of the object.

A character or UI, or a click event semantically associated with "Starting AR comparison" is also provided at the bottom or other positions of the AR comparison queue (see FIG. 2 and FIG. 3), and the user can enter an AR display flow just by clicking the option.

It shall be noted that the AR comparison queue in this step corresponds to summarizing the objects selected by the user, and triggering the entry of the AR display flow by the button "Starting AR comparison". Moreover, it is allowed to delete or add the objects in the AR comparison queue at any time in response to user operations before clicking "Starting AR comparison", but it should be ensured that the number of the objects in the queue is two or more.

As for the step S102, the three-dimensional model information is information capable of presenting an object in a three-dimensional space, and if the object is a mobile phone, the three-dimensional model information thereof may be volume information including its length, width and height, and position information such as a camera and a headphone jack.

Figure 5:
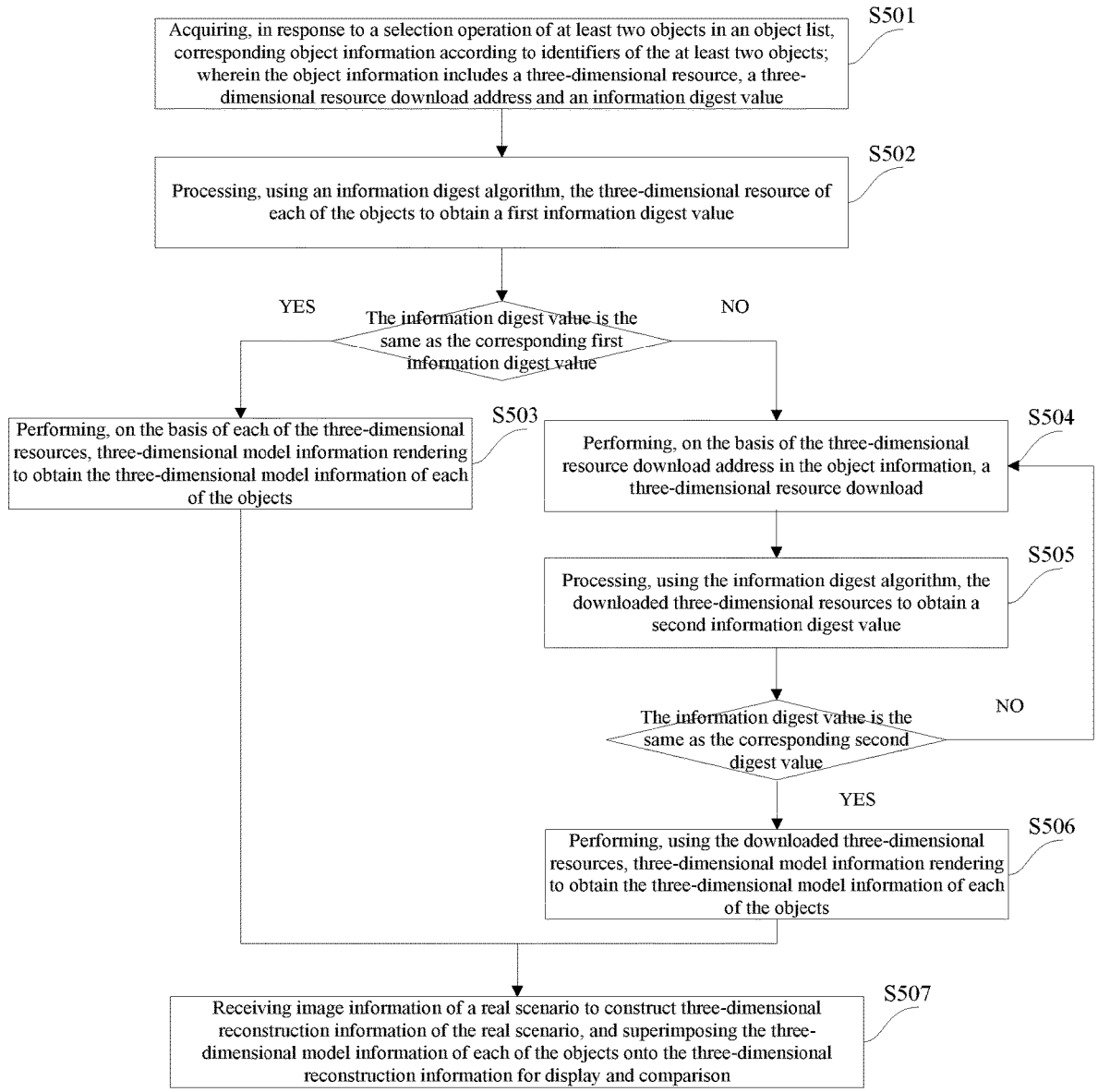
FIG. 5 is a schematic diagram of a main flow of an optional object comparison method according to an embodiment of the disclosure.

Three-dimensional model information rendering of each of the objects may be performed using a 3D rendering module on the basis of 3D resource in the basic information. Reference may be made to the succeeding descriptions of the step as shown in FIG. 5, and no unnecessary details are further given herein.

As for the step S103, the disclosure is required to match the three-dimensional model information of multiple objects with a real scenario, so the real scenario must be subjected to a three-dimensional reconstruction (3D Reconstruction).

Here, the three-dimensional reconstruction refers to establishment of a mathematical model suitable for computer representation and processing with respect to three-dimensional objects, which is a basis for processing, operating and analyzing properties of the objects in a computer environment, and is also a key technique for establishing a virtual reality that expresses the objective world in a computer.

Before performing image processing, a user is required to first acquire a two-dimensional image of a real scenario using an image acquisition device (e.g., a video camera). Moreover, environmental factors should be considered in the acquisition process, because the lighting conditions, the geometric characteristics of the camera, and the like have a great impact on the subsequent image processing.

The collected image information is processed into three-dimensional coordinates using GoogleARCore, AppleARKit, 4×4 Anchor matrix information of a 3D vision coordinate system or other SDKs (Software Development Kit) on the basis of SLAM (Simultaneous Localization And Mapping), so as to construct three-dimensional reconstruction information.

In order to present effects of different objects in the real scenario, the three-dimensional model information of each of the selected objects can be matched with the three-dimensional reconstruction information of the real scenario, so as to present a real superimposition effect. For example, the position of each of the coordinate points in the three-dimensional model information in the three-dimensional reconstruction information is determined on the basis of Projection Matrix, View Matrix, and Pose provided by GoogleARCore, thereby achieving binding.

For example, a user wants to buy a car, but is not sure whether to buy an A-class car or a B-class car, and a black car or a white car, and if two virtual 3D real cars are presented at this time, it is convenient for the user to intuitively know the physical effect of each car so as to determine the car to be bought.

Figure 4:
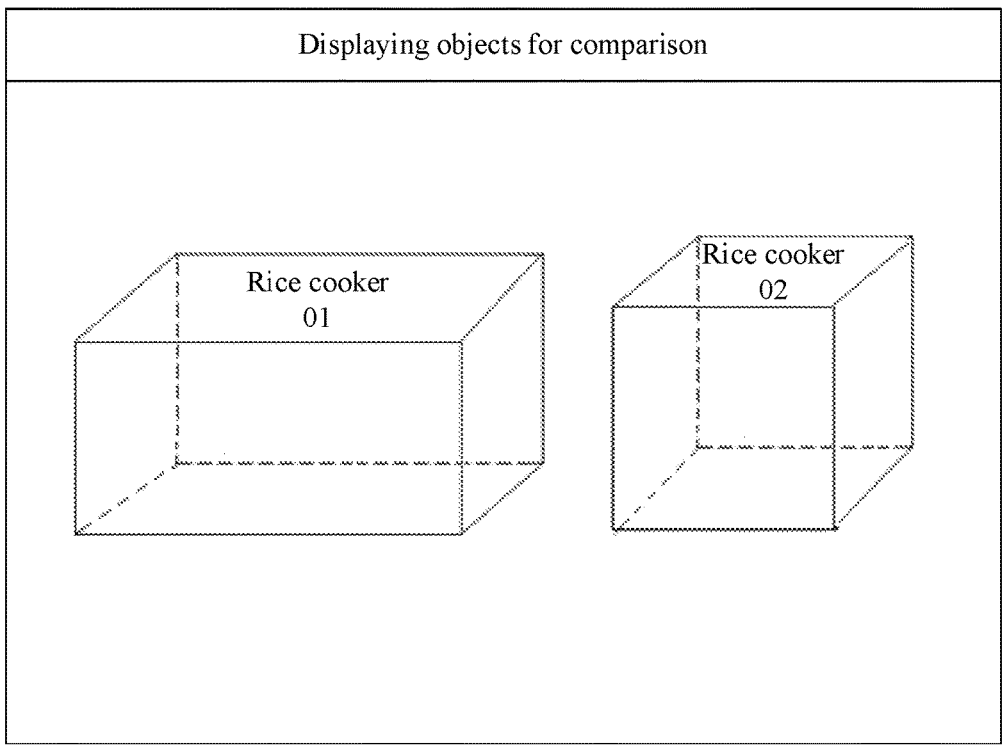
FIG. 4 is a schematic diagram after superimposition of three-dimensional model information of two objects onto three-dimensional reconstruction information of a real scenario.

For another example, as for a rice cooker of a certain type of a certain brand, a user is not sure which color of the rice cooker looks better at home, and two or more rice cookers selected by the user are displayed at home for placement and comparison at the same time in the aforesaid manner, which facilitates intuitive view and selection by the user, as shown in FIG. 4, for example.

Further, different pieces of three-dimensional model information are displayed in the three-dimensional reconstruction information in a certain relative spatial position relationship. For example, when there are only two objects, it can be selected to display the objects in a left-right manner or in an up-down manner; when there are three objects, it can be selected to display the objects in a left-right manner, in a triangular manner, or the like. Thus, different relative spatial position relationships can be constructed according to the number of the objects. Further in combination with the three-dimensional model information (or 3D source, e.g., length, width and height) of each of the objects, the storage position of each of the objects is determined. For example, Object 1 is located on the left side, and Object 2 is located on the right side.

Furthermore, after the three-dimensional model information is superimposed onto the three-dimensional reconstruction information, the user can participate in the operation of placing objects, such as dragging the three-dimensional model information of the rice cooker onto the table.

By taking the Android system as an example, a gesture module of Android can acquire a screenX and screenY coordinate of a gesture by a touch event. The coordinate is a screen coordinate, and is required to be converted into a vision coordinate. Assuming that the screen coordinate is ModelVector3(x, y, z), the screen coordinate is converted into the vision coordinate as ScreenVector3(screenX, screen, ModelVector3.z), thereby achieving the movement and rotation operations of the gesture.

The method provided by the aforesaid embodiment enables a user, when selecting objects, to perform a comparison on the basis of the three-dimensional model information of the objects in addition to knowing the objects on the basis of the basic information thereof, so as to give the user an intuitive feeling, improve the efficiency of object recommendation, and reduce the frequency of object replacement, thereby improving the shopping experience of the user.

FIG. 5 shows a schematic diagram of a flow of an optional object comparison method according to an embodiment of the disclosure, comprising the following steps:

S501: acquiring, in response to a selection operation of at least two objects in an object list, corresponding object information according to identifiers of the at least two objects; wherein the object information includes a three-dimensional resource, a three-dimensional resource download address and an information digest value;

S502: processing, using an information digest algorithm, the three-dimensional resource of each of the objects to obtain a first information digest value;

S503: performing, on the basis of each of the three-dimensional resources, three-dimensional model information rendering to obtain the three-dimensional model information of each of the objects if the information digest value is the same as the corresponding first information digest value;

S504: performing, on the basis of the three-dimensional resource download address in the object information, a three-dimensional resource download if the information digest value is different from the corresponding first information digest value;

S505: processing, using the information digest algorithm, the downloaded three-dimensional resources to obtain a second information digest value;

S506: performing, using the downloaded three-dimensional resources, three-dimensional model information rendering to obtain the three-dimensional model information of each of the objects if the information digest value is the same as the corresponding second information digest value; and S507: receiving image information of a real scenario to construct three-dimensional reconstruction information of the real scenario, and superimposing the three-dimensional model information of each of the objects onto the three-dimensional reconstruction information for display and comparison.

In the aforesaid implementation mode, as for the steps S501 and S507, reference may be made to the descriptions of the steps S101 and S103 as shown in FIG. 1, and no unnecessary details are further given herein.

In the aforesaid implementation mode, as for the steps S502 to S506, the three-dimensional model information rendering of the objects is mainly performed on the basis of a rendering module, and the rendering module includes a rendering library (e.g., OpenGL) or other rendering engines.

The images of the objects on the platform are generally presented in a two-dimensional form, but since the three-dimensional model information is displayed in a three-dimensional manner, it is required to load the 3D resources from the basic information of the objects (the lengths, widths, heights, shapes and other pieces of information of the objects are stored in the basic information); wherein the 3D resource is an independent entity, including a three-dimensional vertex coordinate, a normal, a map, and the like, such as a 3D rice cooker.

The 3D resource is composed of a set of binary data, which may be abnormally modified when transmitted over the network or stored locally. Thus, in addition to the 3D resource, the basic information of the object further includes an MD5 (Message Digest Algorithm MD5) for verifying the 3D resource, ensuring the accuracy of the 3D resource, and avoiding image inconsistency.

The aforesaid MD5 is stored in a server, and the server processes the 3D resource on the basis of the existing MD5 tool to generate a hexadecimal MD5 string. Further, the MD5 string is unique, and the server saves the MD5 string in the basic information of the object. When a client subsequently requests the basic information of the object from the server, the MD5 can be acquired.

In order to judge whether the loaded 3D resource is correct, it is allowed to process the loaded 3D resource at the local client on the basis of the information digest algorithm, so as to obtain an MD5, that is, a first MD5, at the local client.

If the first MD5 is the same as the original loaded MD5, it means that the loaded 3D resource is correct; otherwise, it means that the loaded 3D resource is wrong, and the local client is required to perform a 3D resource download on the basis of the 3D resource download address in the basic information of the object. Similarly, it is required to perform 3D resource verification afterwards.

In addition, the MD5 uses little-endian, inputs any information of an indefinite length, performs grouping in 512-bit, generates four 32-bit data, and finally jointly outputs a fixed 128-bit information digest. The basic process is as follows: padding, chunking, buffer initialization, loop compression, yielding results. Moreover, the MD5 algorithm is a comparatively common algorithm in the art, so as for the server or the local client, in the case of the same 3D resource, the generated MD5 value is also the same.

The disclosure is mainly directed to AR display and comparison of at least two objects, so the above operations can be applied to multiple object operations at one time. Moreover, the three-dimensional model information rendering will be performed only after the correctness of the 3D resource is ensured.

In the method provided by the aforesaid embodiment, the 3D resources are verified by the MD5 for filtering the abnormal 3D resources and re-downloading the correct 3D resources to ensure the correctness of the rendered three-dimensional model information, so as to achieve an intuitive, multi-angle, multi-environment and real-time comparison of appearances of objects of the same type.

Figure 6:
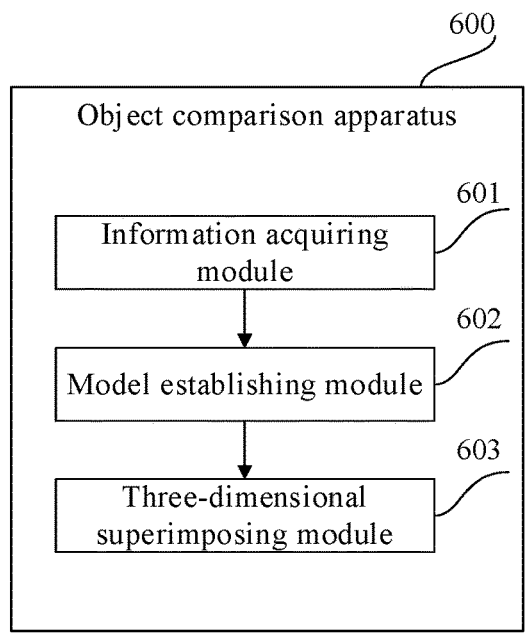
FIG. 6 is a schematic diagram of main modules of an object comparison apparatus according to an embodiment of the disclosure.

FIG. 6 shows a schematic diagram of main modules of an object comparison apparatus 600 provided by an embodiment of the disclosure, comprising:

an information acquiring module 601 for acquiring, in response to a selection operation of at least two objects in an object list, corresponding object information according to identifiers of the at least two objects;

a model establishing module 602 for performing, on the basis of each object information, three-dimensional model information rendering to obtain three-dimensional model information of each of the objects; and a three-dimensional superimposing module 603 for receiving image information of a real scenario to construct three-dimensional reconstruction information of the real scenario, and superimposing the three-dimensional model information of each of the objects onto the three-dimensional reconstruction information for display and comparison.

In the apparatus according to the implementation of the disclosure, the object information includes a three-dimensional resource and an information digest value; the module establishing module 602 is further used for:

processing, using an information digest algorithm, the three-dimensional resource of each of the objects to obtain a first information digest value; and performing, on the basis of each of the three-dimensional resources, three-dimensional model information rendering if the information digest value is the same as the corresponding first information digest value.

In the apparatus according to the implementation of the disclosure, the object information further includes a three-dimensional resource download address;

the model establishing module 602 is used for:

performing, on the basis of the three-dimensional resource download address in the object information, a three-dimensional resource download if the information digest value is different from the corresponding first information digest value;

processing, using the information digest algorithm, the downloaded three-dimensional resources to obtain a second information digest value; and performing, using the downloaded three-dimensional resources, three-dimensional model information rendering if the information digest value is the same as the corresponding second information digest value.

In the apparatus according to the implementation of the disclosure, the three-dimensional superimposing module 603 is used for: determining, in a manner of a three-dimensional vision coordinate system, three-dimensional coordinate values of respective pixels in the image information to construct the three-dimensional reconstruction information on the basis of the three-dimensional coordinate values.

In the apparatus according to the implementation of the disclosure, the three-dimensional superimposing module 603 is used for: determining, in accordance with a predetermined relative spatial position relationship in the three-dimensional reconstruction information, a storage position of each three-dimensional model information to superimpose each three-dimensional model information onto the three-dimensional reconstruction information at the corresponding storage positions for display.

In addition, the specific implementation contents of the apparatus in the embodiment of the disclosure have been described in detail in the above-mentioned method, so no repeated contents are further described herein.

Figure 7:
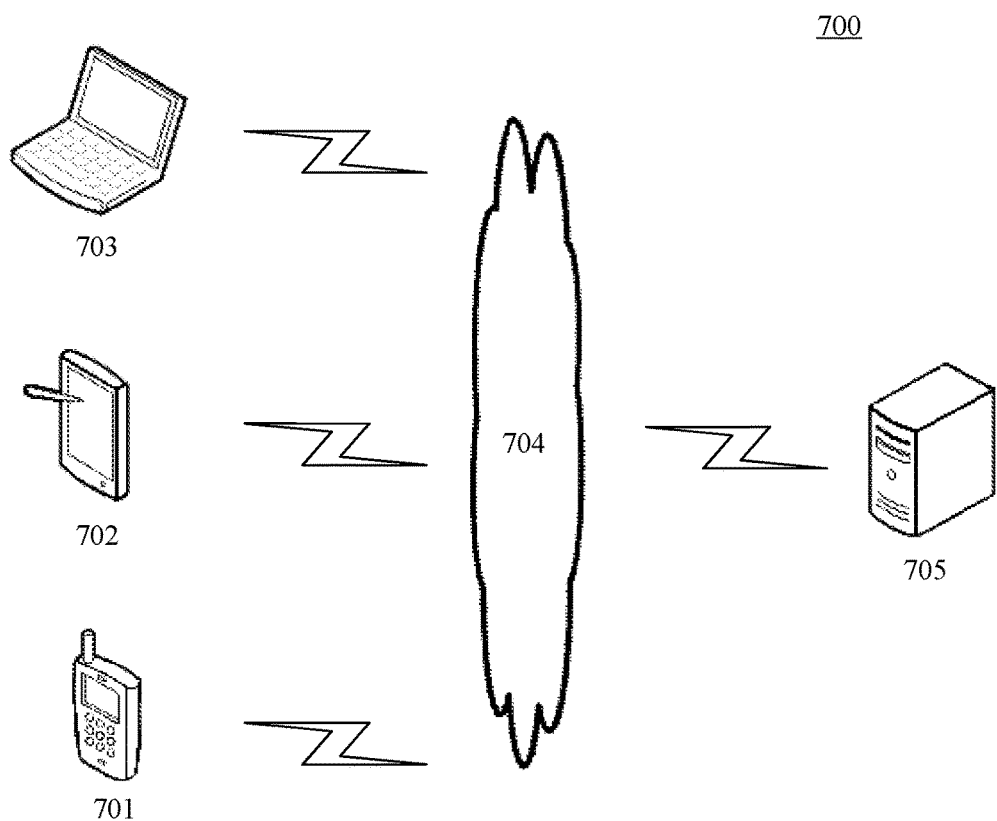
FIG. 7 is an exemplary system architecture diagram to which an embodiment of the disclosure can be applied.

FIG. 7 shows an exemplary system architecture 700 to which an embodiment of the disclosure can be applied.

As shown in FIG. 7, the system architecture 700 may comprise terminal devices 701, 702, 703, a network 704, and a server 705 (only examples). The network 704 is a medium for providing a communication link between the terminal devices 701, 702, 703 and the server 705. The network 704 may include various connection types, such as wired or wireless communication links, or fiber-optic cables.

The user may use the terminal devices 701, 702, 703 to interact with the server 705 through the network 704 to receive or send messages and so on. Various communication client applications may be installed on the terminal devices 701, 702, 703.

The terminal devices 701, 702, 703 may be various electronic devices having screens and supporting web browsing, including but not limited to smart phones, tablet computers, laptop portable computers, desktop computers, and so on.

The server 705 may be a server that provides various services, such as a background management server that provides support for shopping websites browsed by the user using the terminal devices 701, 702, 703 (only an example).

It shall be noted that the method provided by the embodiment of the disclosure is generally performed by the server 705, and correspondingly, the apparatus is generally provided in the server 705.

It should be understood that the numbers of the terminal devices, the networks, and the servers in FIG. 7 are merely schematic. According to implementation requirements, there may be any numbers of terminal devices, networks, and servers.

Figure 8:
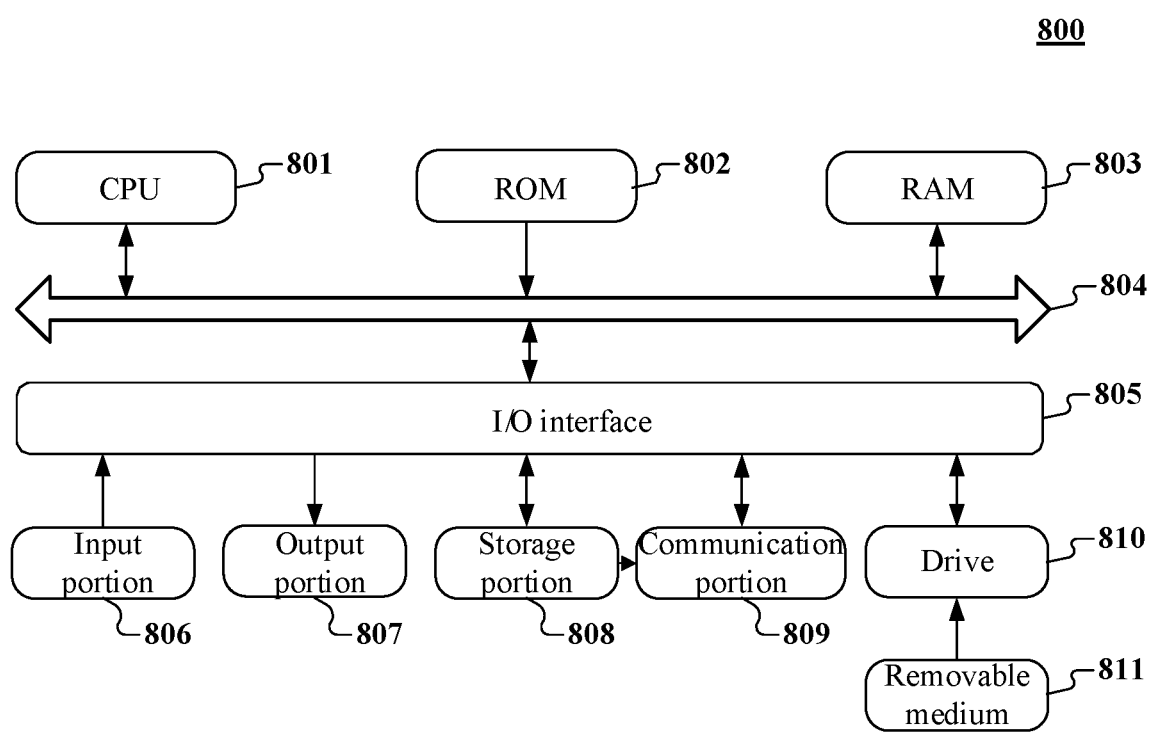
FIG. 8 is a schematic diagram of a structure of a computer system suitable for implementing a terminal device or a server according to an embodiment of the disclosure.

Reference is now made to FIG. 8, which shows a schematic diagram of a structure of a computer system 800 suitable for implementing a terminal device according to an embodiment of the disclosure. The terminal device shown in FIG. 8 is only an example, and shall not impose any limitation on the functions and the scope of use of the embodiment of the disclosure.

As shown in FIG. 8, the computer system 800 includes a central processing unit (CPU) 801, which may perform various appropriate actions and processes according to a program stored in a read-only memory (ROM) 802 or a program loaded from a storage portion 808 into a random access memory (RAM) 803. Various programs and data required for the operation of the system 800 are also stored in the RAM 803. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse, and so on; an output portion 807 including a cathode ray tube (CRT), a liquid crystal display (LCD) and so on, and a speaker and so on; a storage portion 808 including a hard disk and so on; and a communication portion 809 including a network interface card such as a LAN card, a modem, and so on. The communication portion 809 performs communication processing via a network such as the Internet. A drive 810 is also connected to the I/O interface 805 according to requirements. A removable medium 811, such as a magnetic disk, an optical disk, a magneto-optical disk, a semiconductor memory, and so on, is installed on the drive 810 according to requirements so that a computer program read therefrom is installed in the storage portion 808 according to requirements.

In particular, according to the embodiment disclosed in the disclosure, the process described above with reference to the flowchart may be implemented as a computer software program. For example, the embodiment of the disclosure includes a computer program product, which includes a computer program carried on a computer-readable medium, the computer program containing a program code for performing the method shown in the flowchart. In such embodiment, the computer program may be downloaded and installed from the network through the communication portion 809, and/or installed from the removable medium 811. When the computer program is executed by the central processing unit (CPU) 801, the aforesaid functions defined in the system according to the disclosure are executed.

It shall be noted that the computer-readable medium shown in the disclosure may be a computer-readable signal medium or a computer-readable storage medium or any combination of the aforesaid two media. The computer-readable storage medium may be, for example, but not limited to, an electronic, magnetic, optical, electromagnetic, infrared, or semiconductor system, apparatus or device, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the disclosure, the computer-readable storage medium may be any tangible medium containing or storing a program, and the program may be used by or in combination with an instruction execution system, apparatus or device. In the disclosure, the computer-readable signal medium may include a data signal propagated in a baseband or propagated as a part of a carrier wave, in which a computer-readable program code is carried. Such propagated data signal may adopt multiple forms, including but not limited to electromagnetic signals, optical signals, or any suitable combination thereof. The computer-readable signal medium may be also any computer-readable medium other than the computer-readable storage medium, and the computer-readable medium may send, propagate, or transmit a program used by or in combination with the instruction execution system, apparatus or device. The program code contained on the computer-readable medium may be transmitted using any appropriate medium, including but not limited to wireless, wire, optical cable, RF, and so on, or any suitable combination thereof.

The flowcharts and block diagrams in the figures illustrate architectures, functions and operations that may be implemented by systems, methods and computer program products according to various embodiments of the disclosure. In this regard, each block in the flowcharts or block diagrams may represent a module, a program segment, or a part of a code, which contains one or more executable instructions for implementing specified logic functions. It shall be also noted that in some alternative implementations, the functions labeled in the blocks may also occur in an order different from that labeled in the figures. For example, two successively represented blocks may actually be executed substantially in parallel, and they may sometimes be executed in a reverse order, which depends on the functions involved. It shall be also noted that each block in the block diagrams or flowcharts, and combinations of the blocks in the block diagrams or flowcharts may be implemented with a dedicated hardware-based system that performs specified functions or operations, or may be implemented with a combination of dedicated hardware and computer instructions.

The involved modules described in the embodiment of the disclosure may be implemented by software or hardware. The described modules may be also provided in a processor. For example, descriptions may be made as follows: a processor comprising an information acquiring module, a model establishing module, and a three-dimensional superimposing module. The names of these modules do not form limitations of the modules themselves in some cases. For example, the three-dimensional superimposing module may be also described as a "module for superimposing three-dimensional model information onto three-dimensional reconstruction information".

As another aspect, the disclosure also provides a computer-readable medium, which may be included in the devices described in the aforesaid embodiment, or may exist independently without being assembled into the devices. The aforesaid computer-readable medium carries one or more programs, and the aforesaid one or more programs, when executed by one of the devices, cause the device to include:

acquiring, in response to a selection operation of at least two objects in an object list, corresponding object information according to identifiers of the at least two objects;

performing, on the basis of each object information, three-dimensional model information rendering to obtain three-dimensional model information of each of the objects; and receiving image information of a real scenario to construct three-dimensional reconstruction information of the real scenario, and superimposing the three-dimensional model information of each of the objects onto the three-dimensional reconstruction information for display and comparison.

According to the technical solution of the embodiment of the disclosure, it enables a user, when selecting objects, to perform an intuitive comparison on the basis of the three-dimensional model information of the objects in addition to knowing the objects on the basis of the basic information thereof, so as to give the user an intuitive feeling, improve the efficiency of object recommendation, and reduce the frequency of object replacement, thereby improving the shopping experience of the user.

The aforesaid specific implementation modes do not form limitations on the scope of protection of the disclosure. It shall be understood by those skilled in the art that various modifications, combinations, sub-combinations and substitutions may occur depending on design requirements and other factors. Any modification, equivalent replacement, improvement, and so on made within the spirit and principle of the disclosure shall be included in the scope of protection of the disclosure.

The invention claimed is:

1. An object comparison method, comprising:
acquiring, in response to a selection operation of at least two objects in an object list, corresponding object information according to identifiers of the at least two objects;
performing, on the basis of each object information, three-dimensional model information rendering to obtain three-dimensional model information of each of the objects; and
receiving image information of a real scenario to construct three-dimensional reconstruction information of the real scenario, and superimposing the three-dimensional model information of each of the objects onto the three-dimensional reconstruction information for display and comparison,
wherein the object information includes a three-dimensional resource and an information digest value;
the step of performing, on the basis of each object information, three-dimensional model information rendering further comprises:
processing, using an information digest algorithm, the three-dimensional resource of each of the objects to obtain a first information digest value; and
performing, on the basis of each of the three-dimensional resources, three-dimensional model information rendering if the information digest value is the same as the corresponding first information digest value.

2. The method of claim 1, wherein the object information further includes a three-dimensional resource download address;
after the obtainment of the first information digest value, the step further comprises:
performing, on the basis of the three-dimensional resource download address in the object information, a three-dimensional resource download if the information digest value is different from the corresponding first information digest value;
processing, using the information digest algorithm, the downloaded three-dimensional resources to obtain a second information digest value; and
performing, using the downloaded three-dimensional resources, three-dimensional model information rendering if the information digest value is the same as the corresponding second information digest value.

3. The method of claim 2, wherein the step of superimposing the three-dimensional model information of each of the objects onto the three-dimensional reconstruction information for display and comparison comprises:
determining, in accordance with a predetermined relative spatial position relationship in the three-dimensional reconstruction information, a storage position of each three-dimensional model information to superimpose each three-dimensional model information onto the three-dimensional reconstruction information at the corresponding storage position for display.

4. The method of claim 1, wherein the construction of three-dimensional reconstruction information of the real scenario comprises:
determining, in a manner of a three-dimensional vision coordinate system, three-dimensional coordinate values of respective pixels in the image information to construct the three-dimensional reconstruction information on the basis of the three-dimensional coordinate values.

5. The method of claim 4, wherein the step of superimposing the three-dimensional model information of each of the objects onto the three-dimensional reconstruction information for display and comparison comprises:
determining, in accordance with a predetermined relative spatial position relationship in the three-dimensional reconstruction information, a storage position of each three-dimensional model information to superimpose each three-dimensional model information onto the three-dimensional reconstruction information at the corresponding storage position for display.

6. The method of claim 1, wherein the step of superimposing the three-dimensional model information of each of the objects onto the three-dimensional reconstruction information for display and comparison comprises:
determining, in accordance with a predetermined relative spatial position relationship in the three-dimensional reconstruction information, a storage position of each three-dimensional model information to superimpose each three-dimensional model information onto the three-dimensional reconstruction information at the corresponding storage position for display.

7. A non-transitory computer-readable storage medium, on which a computer program is stored, wherein the program, when executed by a processor, implements the method of claim 1.

8. An object comparison apparatus, comprising:
a processor, wherein the processor is configured to performing:

acquiring, in response to a selection operation of at least two objects in an object list, corresponding object information according to identifiers of the at least two objects;

performing, on the basis of each object information, three-dimensional model information rendering to obtain three-dimensional model information of each of the objects; and receiving image information of a real scenario to construct three-dimensional reconstruction information of the real scenario, and superimposing the three-dimensional model information of each of the objects onto the three-dimensional reconstruction information for display and comparison, wherein the object information includes a three-dimensional resource and an information digest value;

the step of performing, on the basis of each object information, three-dimensional model information rendering further comprises:

processing, using an information digest algorithm, the three-dimensional resource of each of the objects to obtain a first information digest value; and performing, on the basis of each of the three-dimensional resources, three-dimensional model information rendering if the information digest value is the same as the corresponding first information digest value.

9. An electrode device, comprising:

one or more processors; and a storage means for storing one or more programs, the one or more programs, when executed by the one or more processors, causing the one or more processors to implement the method of claim 1.

* * * * *